US007996603B2

(12) United States Patent
Matsutani

(10) Patent No.: US 7,996,603 B2
(45) Date of Patent: Aug. 9, 2011

(54) DRAM CONTROLLER THAT FORCES A REFRESH AFTER A FAILED REFRESH REQUEST

(75) Inventor: Takashi Matsutani, Osaka (JP)

(73) Assignee: MegaChips Corporation, Osaka-shi (JP)

( * ) Notice: Subject to any disclaimer, the term of this patent is extended or adjusted under 35 U.S.C. 154(b) by 1013 days.

(21) Appl. No.: 11/681,487

(22) Filed: Mar. 2, 2007

(65) Prior Publication Data

US 2007/0245073 A1    Oct. 18, 2007

(30) Foreign Application Priority Data

Mar. 24, 2006    (JP) ................................ 2006-082652

(51) Int. Cl.
*G06F 12/00*    (2006.01)
(52) U.S. Cl. ................ 711/106; 711/E12.003
(58) Field of Classification Search .............. None
See application file for complete search history.

(56) References Cited

U.S. PATENT DOCUMENTS 6,754,786 B2 *   6/2004   Suzuki et al. ................ 711/150

OTHER PUBLICATIONS

Aaron Rice, (Curiosities), Project Galactic Guide, Feb. 10, 1997, http://www.galactic-guide.com/articles/8R69.html.*

* cited by examiner

*Primary Examiner* — Shane M Thomas
*Assistant Examiner* — Christopher D Birkhimer
(74) *Attorney, Agent, or Firm* — Oblon, Spivak, McClelland, Maier & Neustadt, L.L.P.

(57) ABSTRACT

A refresh controller transmits two refresh request signals of a first request signal which indicates a time at which a refresh operation of a DRAM may be performed and a second request signal which indicates a time at which a refresh operation of the DRAM must be performed, to an arbitrator. On the other hand, also transfer request signals each of which requests a data transfer are transmitted from plural data transfer parts, respectively, to the arbitrator. If no transfer request signal is input when a first request signal is input to the arbitrator, a refresh operation of the DRAM is performed. As a result, a refresh operation is performed when the crowding level of a bus is relatively low. This improves an efficiency in a data transfer.

4 Claims, 8 Drawing Sheets

DRAM CONTROLLER THAT FORCES A REFRESH AFTER A FAILED REFRESH REQUEST

BACKGROUND OF THE INVENTION

1. Field of the Invention

The present invention relates to a memory controller for controlling a dynamic random access memory ("DRAM").

2. Description of the Background Art

For an electronic device such as a digital still camera, a DRAM has been conventionally employed as a memory IC. In a DRAM, capacitors for storing data are provided respectively for memory cells. Because of a simpler structure of a DRAM as compared to a structure of a static random access memory ("SRAM") or the like, an integration density thereof can be easily increased on one hand. However, on the other hand, as electric charges in capacitors decrease with time, a burden of periodically performing a refresh operation for injecting electric charges into memory cells is caused. During a refresh operation, a data transfer with a DRAM such as writing of data and readout of data cannot be accomplished.

In the meantime, recent electronic devices are required to process huge volumes of data such as images in real time. Thus, also a DRAM for storing data which is to be processed is required to transfer huge volumes of data at an extremely high speed.

However, it is necessary to periodically perform a refresh operation of a DRAM. According to the conventional arts, when a necessity of a data transfer and a necessity of a refresh operation arise at the same time, a refresh operation is preferentially performed, so that a data transfer is suspended. Occurrence of such a situation in which a data transfer is suspended in order to preferentially perform a refresh operation probably lowers an effective band of a bus (an efficiency in a data transfer on a bus), leading to reduction of a processing speed of an entire processing system.

SUMMARY OF THE INVENTION

The present invention is directed to a memory controller for controlling a DRAM.

According to the present invention, the memory controller for controlling a DRAM includes: a first generator for generating a signal indicative of a crowding level of a bus used for a data transfer with said DRAM; and an arbitrator for adjusting a time to perform a refresh operation of said DRAM based on said signal indicative of said crowding level.

It is possible to adjust a time to perform a refresh operation taking into consideration the crowding level of the bus. Hence, an efficiency in a data transfer with the DRAM can be improved.

According to one aspect of the present invention, the first generator generates the signal indicative of the crowding level based on an amount of data stored in a memory used for a data transfer with the DRAM.

It is possible to easily determine the crowding level of the bus.

According to another aspect of the present invention, the memory controller further includes a second generator for generating a reference signal with a predetermined generation period, and the arbitrator instructs the DRAM to perform a refresh operation in response to generation of the reference signal when the crowding level of the bus is relatively high, while the arbitrator instructs the DRAM to perform a refresh operation after a shorter period than the predetermined generation period passes from the last generation of the reference signal when the crowding level of the bus is relatively low.

A refresh operation of the DRAM can be performed when the bus is not crowded, to thereby minimize the possibility of occurrence of a situation in which a refresh operation is performed when the bus is crowded.

According to yet another aspect of the present invention, when the predetermined generation period of the reference signal is represented as "Ta", a period during which the refresh operation is allowed to be instructed to be performed prior to generation of the reference signal is represented as "Td", the longest period that each of memory cells in the DRAM is allowed to spend while storing data with no refresh operation being performed is represented as "MT", and the number of word lines of the DRAM is represented as "n", Ta satisfies a relationship in a formula: Ta≦MT/n−Td/n.

It is possible to hold data between two refresh operations.

According to yet another aspect of the present invention, the memory controller further includes a setting part for setting a starting point of the predetermined generation period of the reference signal at a time of a refresh operation of the DRAM.

It is possible to obtain a relatively long period as the predetermined generation period of the reference signal, to thereby reduce the number of refresh operations.

Therefore, it is an object of the present invention to provide a memory controller which allows for improvement of an efficiency in a data transfer with a DRAM while properly performing a refresh operation of the DRAM.

These and other objects, features, aspects and advantages of the present invention will become more apparent from the following detailed description of the present invention when taken in conjunction with the accompanying drawings.

BRIEF DESCRIPTION OF THE DRAWINGS

FIG. 5 is a flow chart illustrating sequential operations performed by an arbitrator and the like.

DESCRIPTION OF THE PREFERRED EMBODIMENTS

Below, a digital still camera will be described as one example of an electronic device to which a memory controller according to preferred embodiments of the present invention is applied. It is noted that a term "DRAM" in the present specification will be used to cover not only a DRAM but also a variety of memory ICs which can be categorized as a DRAM in general, such as an EDO DRAM, an SDRAM, and a DDR SDRAM.

1. First Preferred Embodiment

<1-1. Structure of Digital Still Camera>

Figure 1:
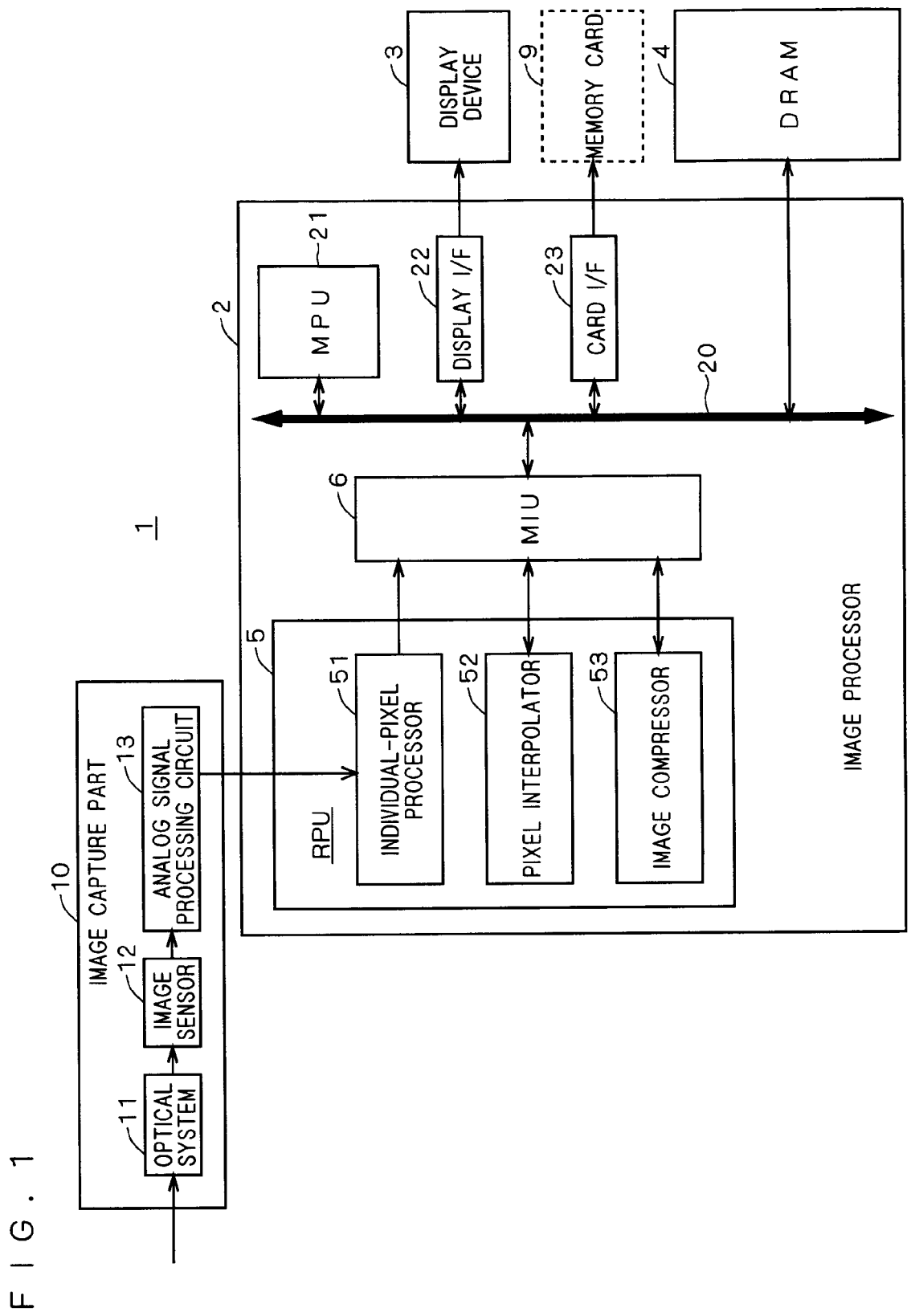
FIG. 1 is a block diagram roughly illustrating a structure of a digital still camera.

FIG. 1 is a block diagram roughly illustrating a structure of a digital still camera 1. The digital still camera 1 functions to shoot a subject to capture a digital image of the subject, and to record the captured digital image on a memory card 9 which is a portable recording medium.

As illustrated in FIG. 1, the digital still camera 1 includes, as principal elements, an image capture part 10 for capturing an image, an image processor 2 for processing a captured image, a display device 3 for displaying an image, such as an LCD, and a DRAM 4 for storing an image which is to be processed. The digital still camera 1 further includes operating members, such as a shutter button and a setting button, which are supposed to be included in a typical digital still camera, although those operating members are not illustrated in the drawings.

The image capture part 10 includes an optical system 11 including a lens, a diaphragm, and the like, an image sensor 12 formed of a CCD, a C-MOS, or the like, and an analog signal processing circuit 13. The optical system 11 forms an image using light incident upon the image capture part 10, to produce an optical image of a subject on an image plane of the image sensor 12. The image sensor 12 performs photoelectrical conversion on the optical image on the image plane of the image sensor 12 and outputs an analog image signal of the subject. The analog signal processing circuit 13 performs necessary operations including removal of a noise and adjustment of a signal level on the analog image signal of the subject which is output from the image sensor 12. The analog signal processing circuit 13 converts the analog image signal into a digital image signal (which will hereinafter be also referred to as an "image") as well.

The image processor 2 is formed of an LSI including various functional circuits for image processing which are integrated on a single chip. More specifically, the image processor 2 includes an MPU 21 for totally controlling the image processor 2, a display I/F 22 which causes the display device 3 to display an image, a card I/F 23 for recording an image on the memory card 9 and reading out an image from the memory card 9, and a real-time processing unit (which will hereinafter be abbreviated to an "RPU") 5 for processing an image captured in the image capture part 10.

The RPU 5 have various image processing functions. An individual-pixel processor 51, a pixel interpolator 52, and an image compressor 53 illustrated in FIG. 1 indicate some of the various image processing functions of the RPU 5. The individual-pixel processor 51 functions to process an image on a pixel-by-pixel basis. More specifically, the individual-pixel processor 51 performs shading correction or the like on an image. The pixel interpolator 52 performs color interpolation. More specifically, the pixel interpolator 52 generates a value of a missing color component in each of pixels in an image by interpolation based on information of surrounding pixels so that each of the pixels can have three color components (R, G, and B, for example). The image compressor 53 compresses an image in a raw format, to convert it into an image in a JPEG format or the like, for the purpose of reducing an amount of data for the image.

Further, the image processor 2 includes a bus 20 used for transfers of various pieces of data including an image. The MPU 21, the display I/F 22, and the card I/F 23 which have been described above are connected directly to the bus 20, and the RPU 5 is connected to the bus 20 via a memory interface unit (which will hereinafter be abbreviated to an "MIU") 6. Also the DRAM 4 is electrically connected to the bus 20, and the MIU 6 functions as a memory controller for exercising various controls over the DRAM 4 (details will be given later).

Figure 2:
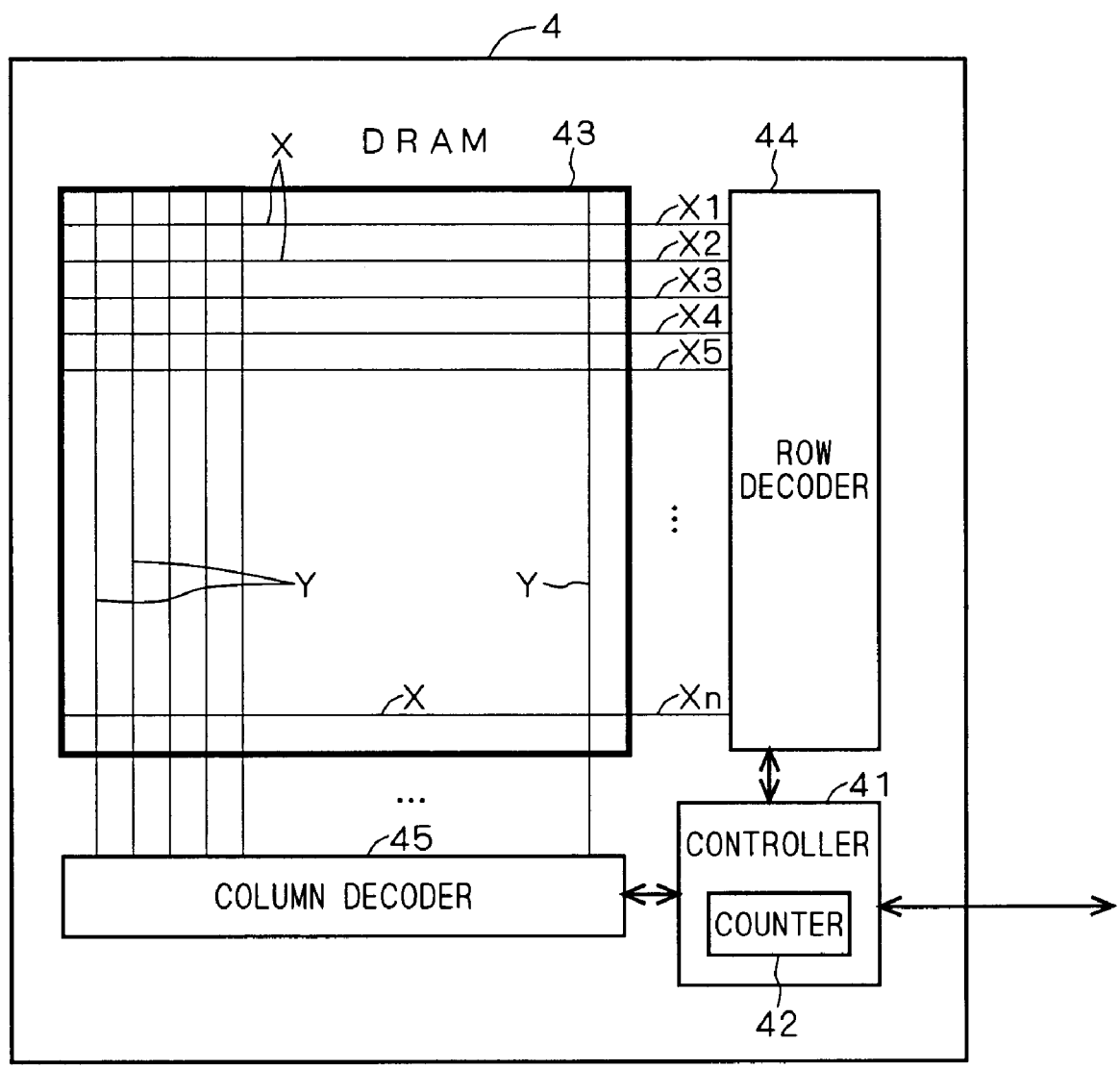
FIG. 2 illustrates a structure of a DRAM.

The DRAM 4 functions as a main memory primarily storing an image which is to be processed by the RPU 5. FIG. 2 illustrates a structure of the DRAM 4. As illustrated in FIG. 2, the DRAM 4 includes a memory matrix 43 including a plurality of memory cells which are arranged in two dimensions, a row decoder 44 for designating a row address, a column decoder 45 for designating a column address, and a controller 41.

In the memory matrix 43, a plurality of word lines X which extend along rows of the memory cells and a plurality of data lines Y which extend along columns of the memory cells are placed. In the first preferred embodiment, it is assumed that the DRAM 4 includes n (n is a natural number larger than two) word lines X. Also, in the following description, reference numerals "X1", "X2", "X3", . . . "Xn" will be used for identifying each of the word lines X, starting from one of the word lines X placed at an end of the memory matrix 43. The number of the word lines X, i.e., n, is 4096 or 8192, for example.

In the memory matrix 43, the memory cells are respectively formed at intersections of the word lines X and the data lines Y. Each of the memory cells includes a capacitor, and is configured to indicate either "0" or "1" as data, depending on electric charges stored in the capacitor.

The row decoder 44 designates a row address by selecting one of the plurality of word lines X. The column decoder 45 designates a column address by selecting one of the plurality of data lines Y. Which of the word lines X or the data lines Y should be selected is determined based on a signal supplied from the controller 41. A data write operation and a data read operation are performed on one of the memory cells which is located at an address designated in the foregoing manner.

The controller 41 controls operations of the DRAM 4 based on a control signal input from the MIU 6 and the like. The operations controlled by the controller 41 include a refresh operation of getting back electric charges which gradually decrease in each of the memory cells, as well as a data write operation and a data read operation. A refresh operation is performed each time a refresh instruction signal transmitted from the MIU 6 is input to the controller 41.

A refresh operation is performed for each of the word lines X. More specifically, in response to input of a single refresh instruction signal, a given word line X is designated as an object of a refresh operation (i.e., a word line which is to be refreshed) by the row decoder 44, and all the memory cells included in the designated given word line X are refreshed. Subsequently, in response to input of a next refresh instruction signal, another word line X (X2, for example) laid next to the given word line X which is an object of the preceding refresh operation (X1, for example) becomes an object of a current refresh operation. In this manner, the word line X which is an object of a current refresh operation is changed each time a refresh instruction signal is input. As such, as a result of n inputs of refresh instruction signals, all of the memory cells included in the DRAM 4 are refreshed once. When the word line Xn becomes an object of a current refresh operation, the word line X1 becomes an object of a next refresh operation.

A refresh instruction signal does not include information which designates one of the word lines X. Which of the word lines X should become an object of a current refresh operation is determined by a counter 42 provided in the controller 41. More specifically, the counter 42 increments an internal variable indicating one of the word lines X each time a refresh instruction signal is input, so that the word line X which becomes an object of a current refresh operation is changed.

The longest period that each of the memory cells can spend while storing data (electric charges) with no refresh operation being performed is previously set. In the following description, the foregoing longest period will be referred to as a "storable period" and reference characters "MT" will be used therefor. A storable period MT is 64 ms, for example. A storable period MT corresponds to an allowable period between a time when one of the word lines X (X1, for example) is refreshed and a time when the same word line X1 again becomes an object of a current refresh operation.

<1-2. Overview of Operations of Digital Still Camera>

Below, operations of the digital still camera 1 for shooting will be briefly described. The digital still camera 1 starts operations for shooting in response to a user's press of the shutter button. First, an exposure process is performed in the image sensor 12, which then outputs an analog image signal. The analog image signal output from the image sensor 12 is subjected to predetermined processing in the analog signal processing circuit 13, to be converted into a digital image signal. Then, the digital image signal is output to the image processor 2 from the analog signal processing circuit 13.

The image output from the analog signal processing circuit 13 is input directly to the individual-pixel processor 51 of the RPU 5. The image is subjected to shading correction or the like in the individual-pixel processor 51, and thereafter, the image is written into the DRAM 4 via the bus 20.

Subsequently, the image is read out from the DRAM 4 via the bus 20, and is input to the pixel interpolator 52. The pixel interpolator 52 performs color interpolation on the image, and thereafter, the image is written into the DRAM 4 via the bus 20.

Then, the image is read out from the DRAM 4 via the bus 20, and is input to the image compressor 53. The image compressor 53 compresses the image, and thereafter, the image is written into the DRAM 4 via the bus 20.

As a result of the above-described operations performed on the image by the RPU 5, the image is placed in a recordable state, and is recorded on the memory card 9 by the card I/F 23. The image recorded on the memory card 9 can be read out from the memory card 9 to be displayed on the display device 3 by the display I/F 22, as necessary.

To achieve the operations for shooting, respective types of image processing of the individual-pixel processor 51, the pixel interpolator 52, and the image compressor 53 are sequentially performed. On the other hand, the digital still camera 1 is configured to be capable of capturing not only a single frame of an image but also temporally-successive frames of images ("continuous shooting"). For continuous shooting, the individual-pixel processor 51, the pixel interpolator 52, and the image compressor 53 behave in a pipelined manner so that three types of image processing thereof proceed in parallel in order to achieve high-speed processing.

As mentioned above, in image processing of each of the individual-pixel processor 51, the pixel interpolator 52, and the image compressor 53, a data transfer with the DRAM 4 using the bus 20 is required. More specifically, an operation for writing an image ("image write operation") is required in the individual-pixel processor 51, and both of an operation for reading out an image ("image read operation") and an image write operation are required in each of the pixel interpolator 52 and the image compressor 53. Thus, in accomplishing continuous shooting, requests for data transfers which are made by the individual-pixel processor 51, the pixel interpolator 52, and the image compressor 53, respectively, coincide with one another.

Further, in addition to the foregoing data transfers, a refresh operation must be periodically performed in the DRAM 4. A refresh operation and a data transfer cannot be performed at the same time. For this reason, there is a need of adjusting a sequence of plural data transfers and a refresh operation in the digital still camera 1. Out of the elements in the digital still camera 1, the MIU 6 is responsible for functions including such adjustment function.

<1-3. MIU>

Figure 3:
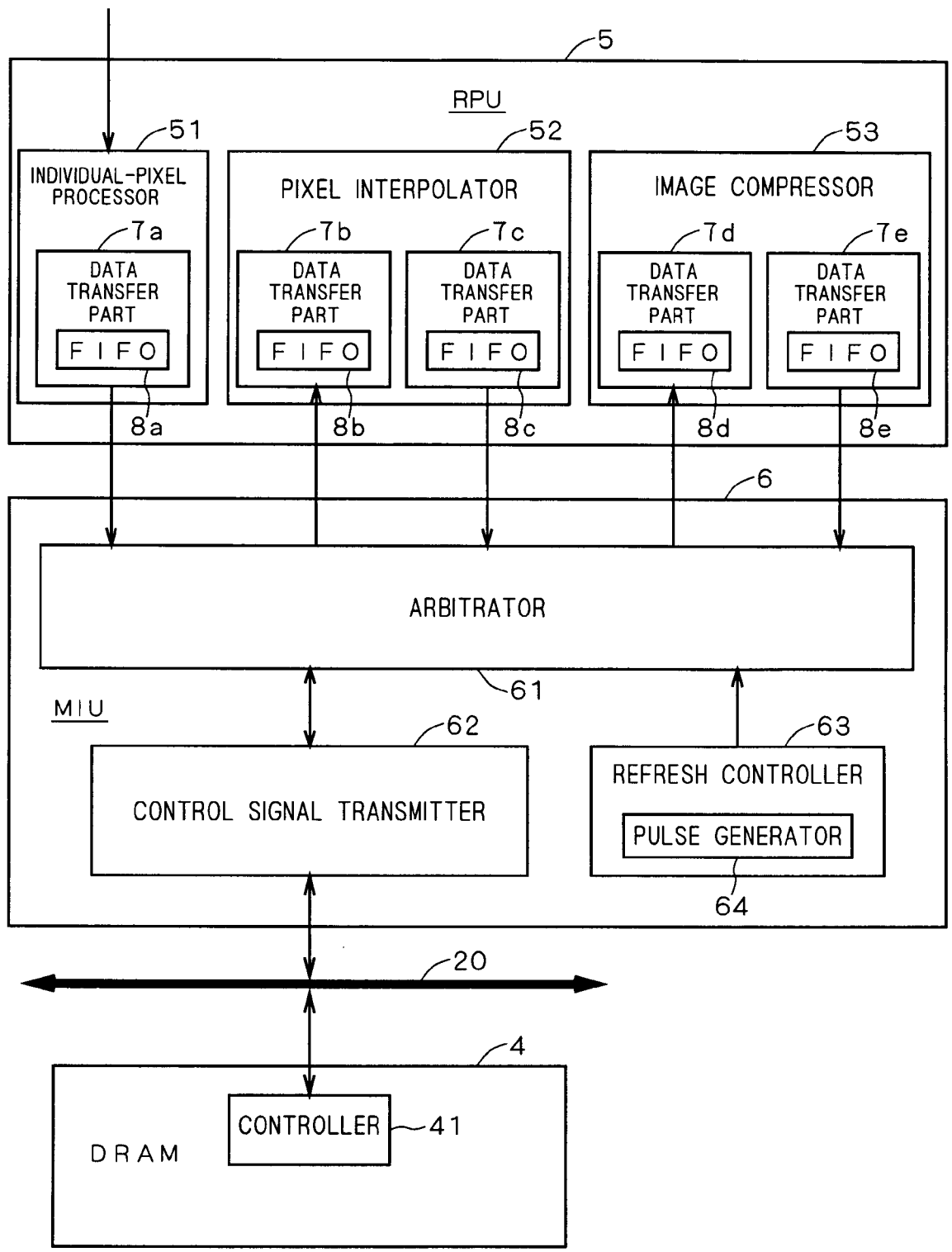
FIG. 3 illustrates a structure of an MIU and peripheral elements of the MIU.

Next, the MIU 6 will be described in detail. FIG. 3 illustrates a structure of the MIU 6 and peripheral elements of the MIU 6. As illustrated in FIG. 3, the MIU 6 includes an arbitrator 61, a control signal transmitter 62, and a refresh controller 63.

The refresh controller 63 transmits a refresh request signal which requests a refresh operation of the DRAM 4, to the arbitrator 61. The arbitrator 61 arbitrates between a request for a data transfer with the DRAM 4 which is made by the RPU 5 and a request for a refresh operation of the DRAM 4. Also, the control signal transmitter 62 generates a control signal (a RAS signal, a CAS signal, a WE signal, or the like) for controlling the DRAM 4, and transmits the generated control signal to the controller 41 of the DRAM 4.

Each of the individual-pixel processor 51, the pixel interpolator 52, and the image compressor 53 of the RPU 5 includes any of data transfer parts 7a, 7b, 7c, 7d, and 7e for performing data transfers with the DRAM 4. Each of the data transfer parts 7a, 7b, 7c, 7d, and 7e forms a DMA channel, and transfers an image from/to the DRAM 4 by direct memory access (DMA) with the exclusive use of the bus 20.

As illustrated in FIG. 3, the individual-pixel processor 51 which performs only an image write operation includes the data transfer part 7a for writing. The pixel interpolator 52 which performs both an image write operation and an image read operation includes the data transfer part 7b for reading and the data transfer part 7c for writing. Likewise, the image compressor 53 which performs both an image write operation and an image read operation includes the data transfer part 7d for reading and the data transfer part 7e for writing.

The data transfer parts 7a, 7b, 7c, 7d, and 7e include FIFOs 8a, 8b, 8c, 8d, and 8e each serving as a buffer memory for a data transfer with the DRAM 4, respectively. Then, each of the data transfer parts 7a, 7b, 7c, 7d, and 7e transmits a transfer request signal which requests a data transfer, to the arbitrator 61, based on an amount of data stored in one of the FIFOs 8a, 8b, 8c, 8d, and 8e which is included therein.

For example, in the data transfer part 7a (for writing) of the individual-pixel processor 51, pieces of processed data are sequentially stored in the FIFO 8a and an amount of data in the FIFO 8a increases as the processing of the individual-pixel processor 51 proceeds. Data stored in the FIFO 8a should be, and is ready to be, transmitted to the DRAM 4. As such, when an amount of data stored in the FIFO 8a exceeds a predetermined threshold value, the data transfer part 7a transmits a transfer request signal which requests a data transfer to the DRAM 4 (writing of data into the DRAM 4), to the arbitrator 61. The data transfer parts 7c and 7e for writing operate in the same manner as the data transfer part 7a.

On the other hand, in the data transfer part 7b (for reading) of the pixel interpolator 52, for example, data which has been read out from the DRAM 4 and is to be processed is stored in the FIFO 8b. Then, pieces of data stored in the FIFO 8b are sequentially processed and an amount of data stored in the FIFO 8b decreases as the processing of the pixel interpolator 52 proceeds. As such, when an amount of data stored in the FIFO 8b falls below a predetermined threshold value, the data transfer part 7b transmits a transfer request signal which requests a data transfer from the DRAM 4 (reading of data from the DRAM 4), to the arbitrator 61. The data transfer part 7d for reading operates in the same manner as the data transfer part 7b.

As described above, each of the data transfer parts 7a, 7b, 7c, 7d, and 7e transmits a transfer request signal based on an amount of data stored in one of the FIFOs 8a, 8b, 8c, 8d, and 8e used for a data transfer with the DRAM 4, which FIFO is included therein. Hence, an amount of data stored in each of the FIFOs 8a, 8b, 8c, 8d, and 8e represents the crowding level of the bus 20 in effect. Also, a transfer request signal indirectly represents an amount of data stored in each of the FIFOs 8a, 8b, 8c, 8d, and 8e, and thus represents the crowding level of the bus 20 in effect.

Because of independent operations of the data transfer parts 7a, 7b, 7c, 7d, and 7e, plural transfer request signals may happen to coincide with each other. In such a situation, the arbitrator 61 determines which of the plural transfer request signals should be accepted, and gives permission for exclusive use of the bus 20 to one of the data transfer parts 7a, 7b, 7c, 7d, and 7e which transmits the transfer request signal determined to be accepted. Then, the one data transfer part is allowed to perform a data transfer. In this regard, if a refresh request signal is transmitted from the refresh controller 63 at that time, the arbitrator 61 determines which of plural request signals including the plural transfer request signals and the refresh request signal transmitted from the refresh controller 63 should be accepted.

When the arbitrator 61 determines that any of transfer request signals should be accepted, a signal which instructs the DRAM 4 to perform a data transfer (a data write signal or a data read signal) is transmitted as a control signal from the control signal transmitter 62 to the DRAM 4, so that a data transfer is accomplished. On the other hand, when the arbitrator 61 determines that a refresh request signal should be accepted, a refresh instruction signal is transmitted as a control signal from the control signal transmitter 62 to the DRAM 4, so that a refresh operation is performed. In this case, also the refresh controller 63 is notified of acceptance of a refresh request signal.

The refresh controller 63 is configured to transmit two kinds of signals as a refresh request signal. In this connection, the refresh controller 63 includes a pulse generator 64 for generating a reference pulse with a predetermined generation period. The reference pulse generated by the pulse generator 64 serves as a reference signal for determining a time to transmit the two kinds of refresh request signals.

Figure 4:
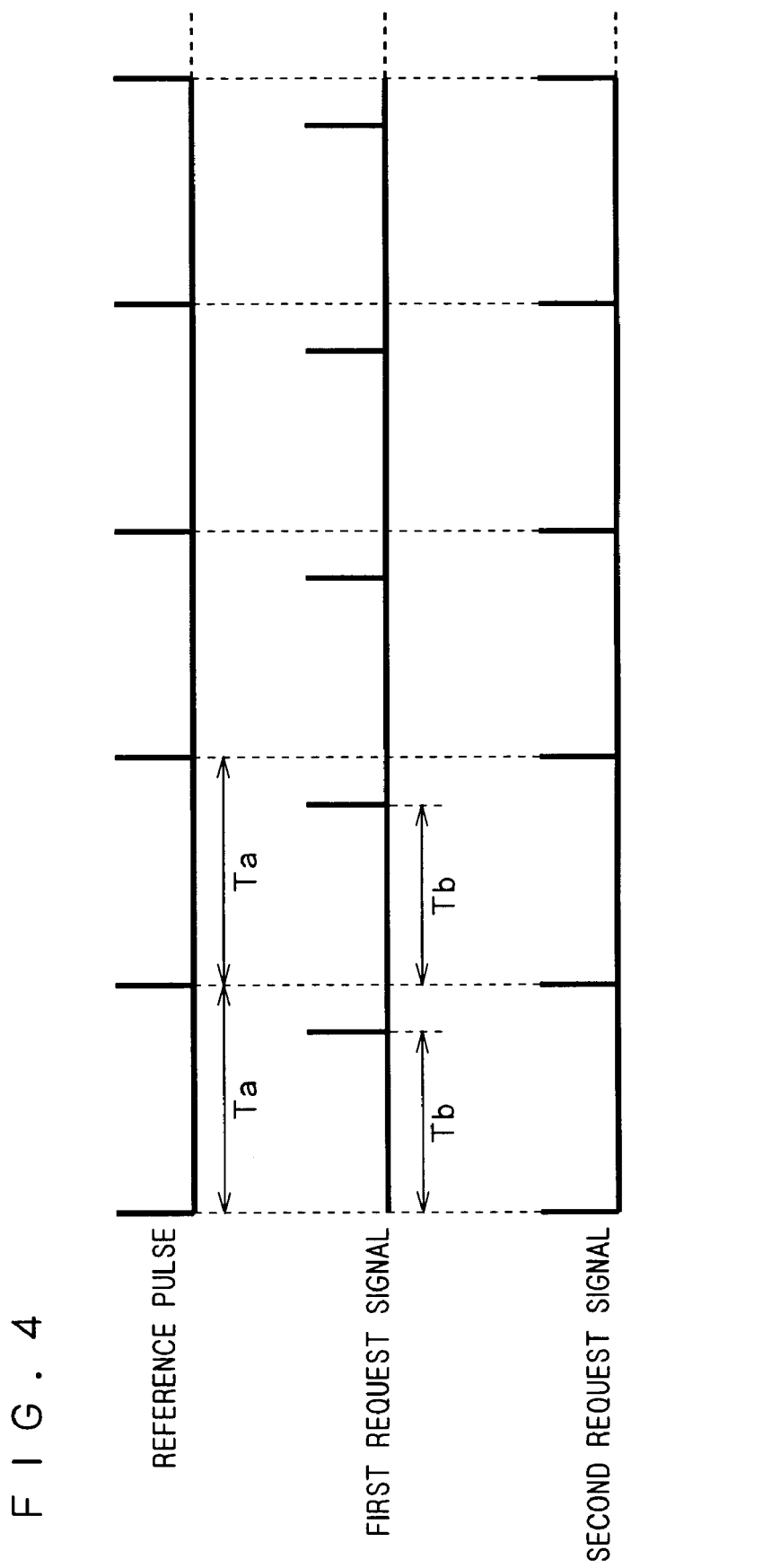
FIG. 4 shows a relationship between times of generation of reference pulses and times of transmission of refresh request signals.

FIG. 4 is a timing chart for showing a relationship between times of generation of reference pulses and times of transmission of the two kinds of refresh request signals. As shown in FIG. 4, the reference pulses are generated with a predetermined generation period Ta. Then, at a time when a predetermined period Tb (<Ta) passes from a time of generation of a given reference pulse, a first refresh request signal (which will hereinafter be referred to as a "first request signal") is transmitted. Further, at the same time as a next generation pulse is generated, a second refresh request signal (which will hereinafter be referred to as a "second request signal") is transmitted. The periods Ta and Tb are previously stored in a register or the like of the refresh controller 63.

A first request signal serves as a request signal whose emergency level is relatively low, while a second request signal serves as a request signal whose emergency level is relatively high. In other words, a first request signal indicates a time at which a refresh operation may be performed, while a second request signal indicates a time at which a refresh operation must be performed. A second request signal is not always transmitted. A second request signal is transmitted on condition that a refresh operation is not performed despite transmission of a first request signal.

<1-4. Adjustment>

Figure 5:
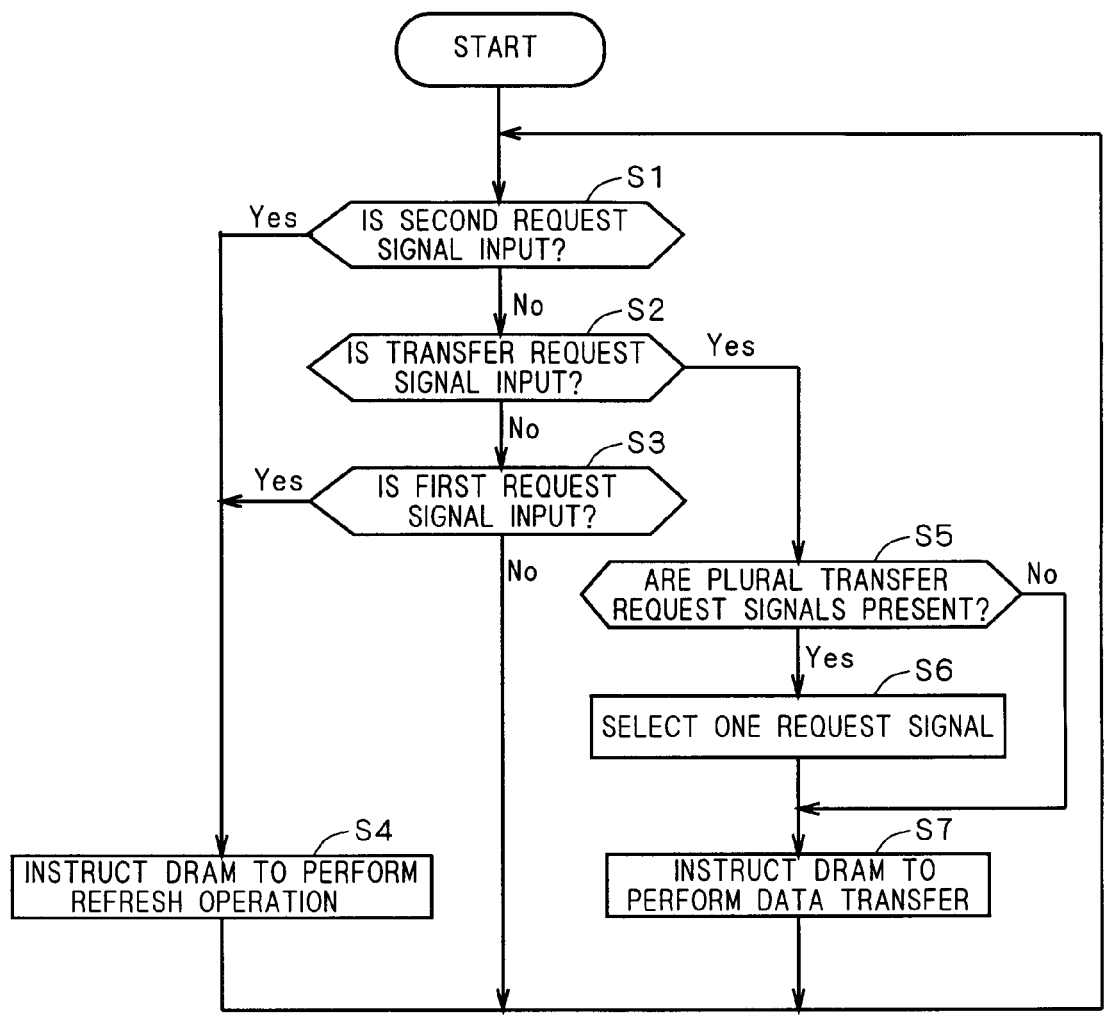

Operations for adjustment performed by the arbitrator 61 will be described in detail. FIG. 5 is a flow chart illustrating sequential operations performed by the arbitrator 61 and the control signal transmitter 62.

If neither a refresh request signal nor a transfer request signal is input, the arbitrator 61 is placed in a standby mode, waiting for input of either a refresh request signal or a transfer request signal ("No" in each of steps S1, S2, and S3).

In response to input of any request signal to the arbitrator 61, a determination is made as to whether or not a second request signal is input, first (step S1). Then, if a second request signal is input ("Yes" in step S1), a refresh instruction signal is transmitted from the control signal transmitter 62 to the DRAM 4 so that a refresh operation of the DRAM 4 can be performed (step S4).

If a second request signal is not input, a further determination is made as to whether or not a transfer request signal is input (step S2). If a transfer request signal is input, ("Yes" in step S2), a still further determination is made as to whether or not plural transfer request signals are present (step S5). Then, when it is determined that only a single transfer request signal is present, the control signal transmitter 62 instructs the DRAM 4 to perform a data transfer based on the input transfer request signal (step S7). On the other hand, when it is determined that plural transfer request signals are present, one of the plural transfer request signals is selected in accordance with a predetermined order of precedence (step S6). Then, the control signal transmitter 62 instructs the DRAM 4 to perform a data transfer based on the selected transfer request signal (step S7).

If neither a second request signal nor a transfer request signal is input, a determination is made as to whether or not a first request signal is input (step S3). Then, when it is determined that a first request signal is input ("Yes" in step S3), a control signal transmitter 62 transmits a refresh instruction signal to the DRAM 4 so that a refresh operation can be performed (step S4).

As is described above, in the arbitrator 61, a second request signal has precedence over both of a transfer request signal and a first request signal, and a transfer request signal has precedence over a first request signal. This order of precedence is used for determining as to which request signal should be accepted. Accordingly, when a second request signal is input, a refresh operation is instructed to be performed regardless of the presence or absence of a transfer request signal. On the other hand, even when a first request signal is input, a refresh operation is not instructed to be performed if a transfer request signal is input.

Figure 6:
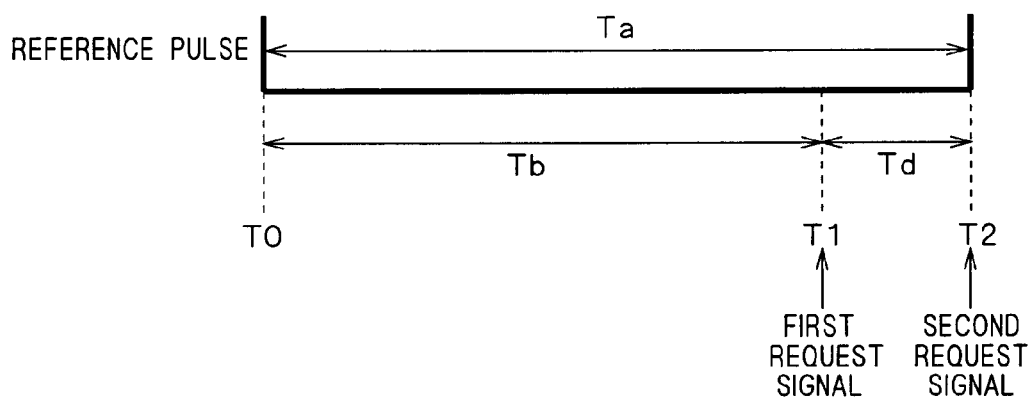
FIG. 6 illustrates one period of a reference pulse.

Now, the foregoing operations will be described in a chronological order, starting from a time at which a given reference pulse is generated. FIG. 6 illustrates one period Ta of a given reference pulse. In FIG. 6, a time at which the given generation pulse is generated, i.e., a starting point, is denoted by a reference numeral "T0". At a time T1 after the period Tb passes from the time T0, a first request signal is transmitted from the refresh controller 63.

If a transfer request signal is transmitted at the time T1, a data transfer is instructed to be preferentially performed. On the other hand, if no transfer request signal is transmitted at the time T1, a refresh operation is instructed to be performed. Also, in a case where a transfer request signal is transmitted at the time T1, if other transfer request signals are not transmitted at a time of completing a data transfer based on the transmitted transfer request signal, a refresh operation is instructed to be performed at that time.

However, if the period Ta passes from the time T0 and a time T2 at which a next reference pulse should be generated comes while a refresh operation has yet to be instructed to be performed, a second request signal is transmitted from the refresh controller 63. At the time T2, the DRAM 4 is placed in a state in which a refresh operation thereof must be immediately performed. Accordingly, a refresh operation is instructed to be performed regardless of the presence or absence of a transfer request signal.

As is made clear from the above description, according to the first preferred embodiment, a refresh operation is instructed to be performed at a certain time in a period Td(=Ta−Tb) between the time T1 at which a first request signal is generated and the time T2 at which a second request signal is generated. Thus, a refresh operation is not routinely instructed to be performed at the same time as a second request signal (reference pulse) whose emergency level is relatively high is generated. Instead, the period Td having a certain length (which will hereinafter be referred to as an "extra period") is provided so that a refresh operation can be instructed to be performed prior to generation of a second request signal.

A transfer request signal indicates the crowding level of the bus 20 as described above. Specifically, the presence of a transfer request signal indicates that the crowding level of the bus 20 is higher than a reference level, while the absence of a transfer request signal indicates that the crowding level of the bus 20 is lower than a reference level. As such, according to the first preferred embodiment, when the crowding level of the bus 20 is relatively high, a refresh operation is instructed to be performed in response to generation of a reference pulse (second request signal). On the other hand, when the crowding level of the bus 20 is relatively low, a refresh operation is instructed to be performed after a shorter period than the period Ta passes from a time of the last generation of a reference pulse. Additionally, a transfer request signal indirectly indicates an amount of data stored in each of the FIFOs 8a, 8b, 8c, 8d, and 8e as described above. Thus, it can be considered that the arbitrator 61 determines the crowding level of the bus 20 based on an amount of data stored in each of the FIFOs 8a, 8b, 8c, 8d, and 8e.

According to the first preferred embodiment, with the functions of the MIU 6, the extra period Td having a certain length in which a refresh operation can be instructed to be performed is reserved and a refresh operation is timed during the extra period Td in accordance with the crowding level of the bus 20 used for a data transfer. Accordingly, a refresh operation can be performed when the crowding level of the bus 20 is relatively low. This minimizes the possibility of occurrence of a situation in which a refresh operation is performed when huge volumes of data should be transferred via the bus 20. Hence, an efficiency in a data transfer is prevented from being reduced because of a refresh operation, which results in improvement of an efficiency in a data transfer.

<1-5. Period of Generation of Reference Pulse>

Figure 7:
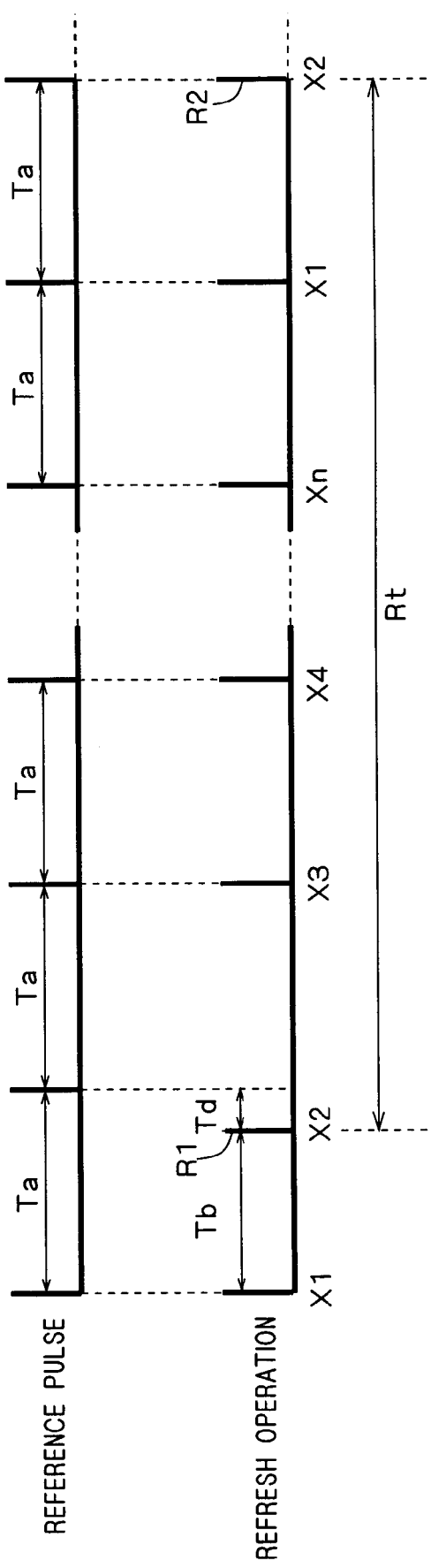
FIG. 7 shows a relationship between times of generation of reference pulses and times of refresh operations.

Below, the generation period Ta of a reference pulse will be described in detail. FIG. 7 illustrates one example of a relationship between times of generation of reference pulses and times of refresh operations. In FIG. 7, a lower part illustrates times at which refresh operations are performed. Reference numerals "X1", X2" . . . located in respective positions of the times at which refresh operations are performed in FIG. 7 indicate the word lines X which are refreshed at the respective times.

Now, draw attention to the word line X2 in FIG. 7, for example. A first refresh operation R1 is performed at the same time as a first request signal is generated and a second refresh operation R2 is performed at the same time as a second refresh operation is generated.

Assuming that a period between the two refresh operations R1 and R2 of the word line X2 in the foregoing example in FIG. 7 is "Rt", the period Rt is the longest period that passes with no refresh operation of the word line X2 being performed. Accordingly, in order to surely hold data of the DRAM 4, the period Rt must be equal to or smaller than the storable period MT as expressed by the following formula (1):

$$Rt \leq Mt \qquad \text{formula (1)}.$$

Thus, the generation period Ta of a reference pulse is set to always satisfy a relationship in the formula (1) in the first preferred embodiment.

As is appreciated from FIG. 7, a reference pulse is generated n+1 times in a duration from a time at which the first refresh operation R1 of the word line X2 is finished to a time at which the second refresh operation R2 is started. This can be expressed by the following formula (2):

$$Rt = Ta \cdot n + Td \qquad \text{formula (2)}.$$

To substitute terms in a right side of the formula (2) into Rt in the formula (1) results in the following formula (3):

$$Ta \cdot n + Td - MT \qquad \text{formula (3)}.$$

As a consequence, a suitable value at which the generation period Ta of a reference pulse should be set is a value satisfying a relationship in the following formula (4):

$$Ta \leq MT/n - Td/n \qquad \text{formula (4)}.$$

By setting the generation period Ta of a reference pulse to satisfy the relationship in the formula (4), it is possible to surely hold data even if the extra period Td is reserved.

For example, the generation period Ta of a reference pulse can be set as expressed by the following formula (5):

$$Ta = MT/n - Td \qquad \text{formula (5)}.$$

As n is a natural number greater than two in the formula (5), it is clear that the generation period Ta of a reference pulse which is set as expressed by the formula (5) satisfies the relationship in the formula (4).

2. Second Preferred Embodiment

Next, a second preferred embodiment will be described. According to the first preferred embodiment, a reference pulse is always generated with a constant period. In contrast thereto, according to the second preferred embodiment, a time to generate a reference pulse is changed in line with a time at which a refresh operations is actually performed. As the second preferred embodiment is mostly identical to the first preferred embodiment, differences from the first preferred embodiment will be mainly discussed below.

Figure 8:
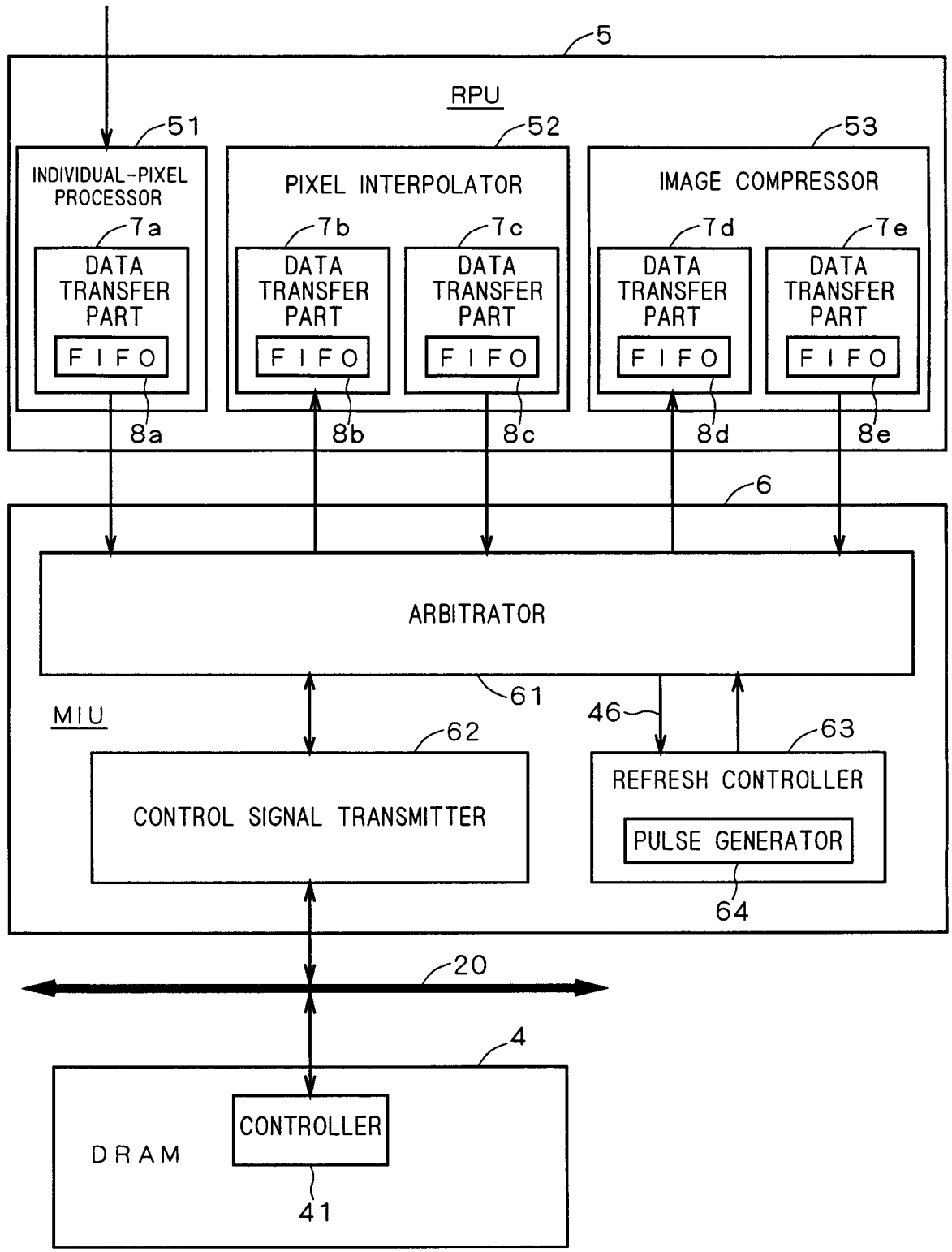
FIG. 8 illustrates another structure of the MIU and another peripheral elements of the MIU.

FIG. 8 illustrates a structure of the MIU 6 and peripheral elements of the MIU 6 according to the second preferred embodiment. According to the second preferred embodiment, a signal line 46 for connecting the arbitrator 61 and the refresh controller 63 is additionally included. All the other elements than the signal line 46 in the second preferred embodiment are identical to the corresponding elements illustrated in FIG. 3 according to the first preferred embodiment, respectively.

According to the second preferred embodiment, a time at which a request for a refresh operation was actually accepted by the arbitrator 61 is input to the refresh controller 63, as a signal, through the signal line 46. Upon receipt of that signal, the refresh controller 63 resets a generation period of a reference pulse generated by the pulse generator 64 based on the received signal (indicating a certain time). As a result, a starting point of a generation period of a reference pulse is set at a time of actual occurrence of a refresh operation.

Figure 9:
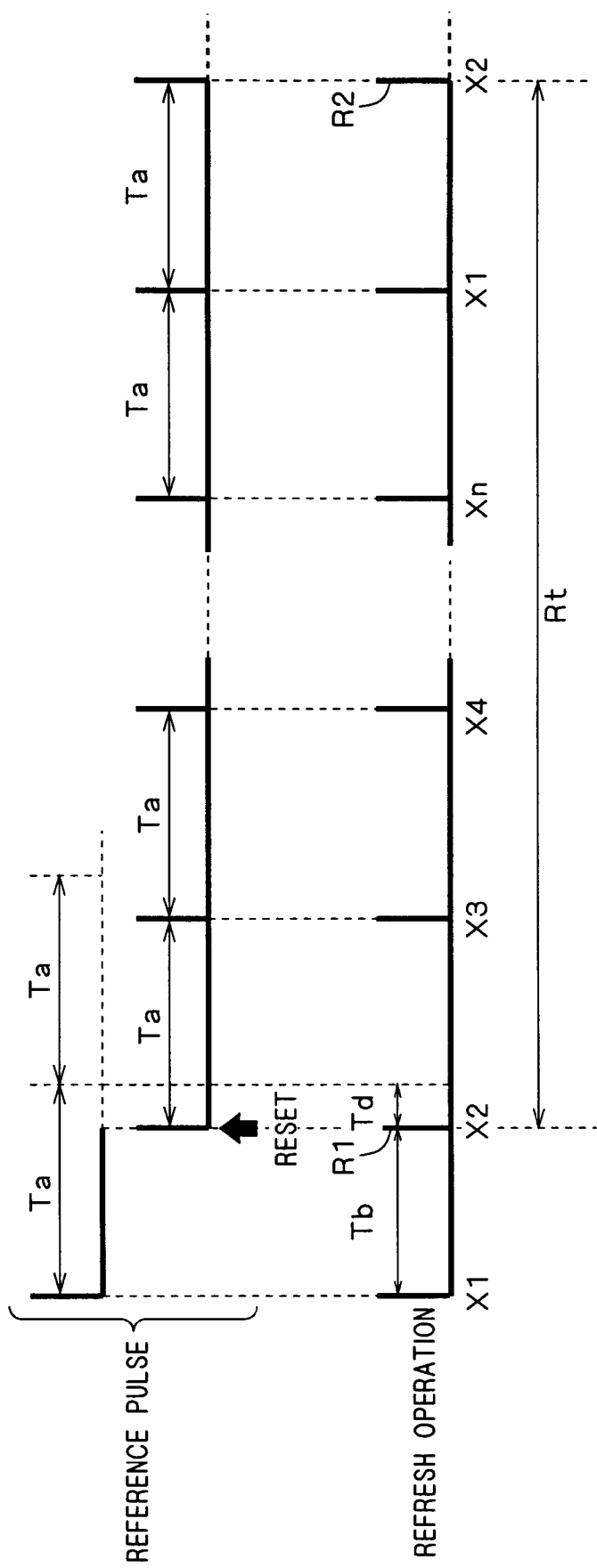
FIG. 9 shows another relationship between times of generation of reference pulses and times of refresh operations.

FIG. 9 illustrates one example of a relationship between times of generation of reference pulses and times of refresh operations according to the second preferred embodiment. Similarly to the FIG. 7, a lower part of FIG. 9 illustrates times at which refresh operations are performed. Regarding the word line X2, a first refresh operation R1 is performed at the same time as a first request signal is generated, and a second refresh operation R2 is performed at the same time as a second request signal is generated in the example illustrated in FIG. 9.

According to the second preferred embodiment, a starting point of a generation period of a reference pulse is set in line with a time at which a refresh operation is actually performed. In the example illustrated in FIG. 9, a generation period of a reference pulse is reset in line with the time at which the first refresh operation R1 is performed. Additionally, in a case where a refresh operation is performed at the same time as a second request signal (reference pulse) is generated, a generation period of a reference pulse does not need to be reset because in that case, generation of reference pulses and occurrence of refresh operations coincide with each other even without reset of the generation period.

In the example illustrated in FIG. 9, only the first refresh operation R1 is performed prior to generation of a second request signal. A period Rt between the two refresh operations R1 and R2 in this example is the longest period that passes with no refresh operation of the word line X2 being performed.

As is appreciated from FIG. 9, the period Rt is expressed by the following formula (6):

$$RT = Ta \cdot n \qquad \text{formula (6)}.$$

To substitute terms in a right side of the formula (6) into Rt in the formula (1) results in the following formula (7):

$$Ta \cdot n \leq MT \qquad \text{formula (7)}.$$

As such, it is possible to surely hold data by setting the generation period Ta of a reference pulse to satisfy a relationship in the following formula (8):

$$Ta \leq MT/n \qquad \text{formula (8)}.$$

As is clarified from comparison between the formula (8) and the formula (4), according to the second preferred embodiment, the generation period Ta of a reference pulse is not affected by the extra period Td and can be set to be relatively long. Hence, the number of refresh operations to be performed can be reduced, to thereby more reliably minimize the possibility of occurrence of a situation in which a refresh operation is performed when huge volumes of data should be transferred via the bus 20. Therefore, an efficiency in a data transfer on the bus 20 is further improved.

3. Other Preferred Embodiments

Hereinbefore, the preferred embodiments of the present invention have been described. However, the present invention is not limited to the above-described preferred embodiments, and various modifications are possible.

The above preferred embodiments have been described by taking as an example a case in which the memory controller is applied to a digital still camera. However, the memory controller may be applied to other types of electronic devices. Especially, the above-described memory controller can be suitably applied to electronic devices which are required to process huge volumes of data such as images in real time, such as a video camera, a copier, a facsimile, and a scanner.

Further, according to the above-described preferred embodiments, the crowding level of the bus 20 is determined depending on the presence or absence of a transfer request signal, so that an amount of data stored in each of the FIFOs 8a, 8b, 8c, 8d, and 8e is indirectly based on in determining the crowding level of the bus 20. Alternatively, the crowding level of the bus 20 may be determined directly based on an amount of data stored in each of the FIFOs 8a, 8b, 8c, 8d, and 8e of the data transfer parts 7a, 7b, 7c, 7d, and 7e. To this end, the arbitrator 61 acquires information about an amount of data stored in the FIFOs 8a, 8b, 8c, 8d, and 8e directly from the FIFOs 8a, 8b, 8c, 8d, and 8e. According to such alternative embodiment, the crowding level of the bus 20 can be easily determined as well.

Moreover, some of the functions implemented by hardware circuits in the above-described preferred embodiments may alternatively be implemented by operations of the MPU in accordance with a certain program with the use of a software.

While the invention has been shown and described in detail, the foregoing description is in all aspects illustrative and not restrictive. It is therefore understood that numerous modifications and variations can be devised without departing from the scope of the invention.

What is claimed is:

1. A memory controller for controlling a DRAM, comprising:
 a first generator that generates and transmits a signal indicative of a crowding level of a bus used for a data transfer with said DRAM;
 a refresh request unit configured to generate a reference signal with a predetermined generation period and to transmit a first refresh request and a second refresh request, said first refresh request being transmitted during said predetermined generation period, and said second refresh request being transmitted in response to the generation of the reference signal when a refresh operation of said DRAM has not been performed during the predetermined generation period; and
 an arbitrator that adjusts a time to perform the refresh operation of said DRAM based on said signal indicative of said crowding level input from said first generator,
 wherein said arbitrator instructs said DRAM to perform the refresh operation in response to said arbitrator receiving said second refresh request, and
 said arbitrator instructs said DRAM to perform the refresh operation when said arbitrator receives said first refresh request and when said signal indicative of said crowding level is not input.

2. The memory controller according to claim 1, wherein said first generator generates said signal indicative of said crowding level based on an amount of data stored in a memory used for a data transfer with said DRAM.

3. The memory controller according to claim 1,
 wherein when said predetermined generation period of said reference signal is represented as "Ta", a finite period during which said refresh operation is allowed to be instructed to be performed prior to generation of said reference signal is represented as "Td", the longest finite period that each of memory cells in said DRAM is allowed to spend while storing data with no refresh operation being performed is represented as "MT", and the number of word lines of said DRAM is represented as "n", Ta satisfies a relationship in a formula: $Ta \leqq MT/n - Td/n$.

4. The memory controller according to claim 1, further comprising
a setting part that sets a starting point of said predetermined generation period of said reference signal at a time of a refresh operation of said DRAM.

* * * * *